(12) United States Patent
Orzell (10) Patent No.: US 7,613,536 B2
(45) Date of Patent: Nov. 3, 2009

(54) METHOD FOR CALCULATING A MATERIALS REQUIREMENTS PLAN FOR DEMANDS CONTAINING MULTIPLE DEMAND DATES AND PRIORITIES

(75) Inventor: Robert A. Orzell, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/278,818

(22) Filed: Apr. 6, 2006

(65) Prior Publication Data

US 2007/0239304 A1    Oct. 11, 2007

(51) Int. Cl.
*G06F 19/00* (2006.01)
*G06Q 10/00* (2006.01)
(52) U.S. Cl. .................. 700/101; 700/102; 700/107; 705/28
(58) Field of Classification Search .............. 700/96, 700/97, 99–102, 106–108, 236; 705/28, 705/29
See application file for complete search history.

(56) References Cited

U.S. PATENT DOCUMENTS

| | | | |
|---|---|---|---|
| 5,216,612 A | | 6/1993 | Cornett et al. |
| 5,548,518 A | * | 8/1996 | Dietrich et al. ............ 700/100 |
| 5,699,259 A | * | 12/1997 | Colman et al. .............. 700/99 |
| 5,751,580 A | | 5/1998 | Chi |
| 5,787,000 A | | 7/1998 | Lilly et al. |
| 5,818,716 A | | 10/1998 | Chin et al. |
| 5,971,585 A | | 10/1999 | Dangat et al. |
| 6,088,626 A | * | 7/2000 | Lilly et al. ................. 700/100 |
| 6,272,389 B1 | | 8/2001 | Dietrich |
| 6,434,443 B1 | | 8/2002 | Lin |
| 6,584,370 B2 | | 6/2003 | Denton et al. |
| 6,701,201 B2 | | 3/2004 | Hedge et al. |
| 6,731,999 B1 | | 5/2004 | Yang et al. |
| 7,058,587 B1 | | 6/2006 | Horne |
| 7,197,469 B2 | | 3/2007 | Hegde et al. |
| 7,286,889 B1 | | 10/2007 | Orzell et al. |
| 7,292,904 B2 | | 11/2007 | Denton et al. |
| 7,308,330 B2 | | 12/2007 | Jones |
| 7,356,376 B1 | | 4/2008 | Aboujaoude et al. |
| 7,379,781 B2 | | 5/2008 | Treichler et al. |
| 7,385,529 B2 | * | 6/2008 | Hersh et al. ................ 340/988 |
| 2002/0198757 A1 | | 12/2002 | Hedge et al. |
| 2003/0149631 A1 | | 8/2003 | Crampton et al. |
| 2004/0186605 A1 | | 9/2004 | Wu et al. |
| 2005/0096771 A1 | | 5/2005 | Denton et al. |
| 2005/0171625 A1 | | 8/2005 | Denton et al. |
| 2005/0171786 A1 | | 8/2005 | Denton et al. |
| 2005/0171824 A1 | | 8/2005 | Denton et al. |
| 2005/0171828 A1 | | 8/2005 | Denton et al. |
| 2005/0177465 A1 | | 8/2005 | Orzell et al. |
| 2006/0282343 A1 | | 12/2006 | Palanisamy et al. |
| 2007/0239297 A1 | | 10/2007 | Degbotse et al. |
| 2007/0239304 A1 | | 10/2007 | Orzell |

* cited by examiner

*Primary Examiner*—Sean P Shechtman
(74) *Attorney, Agent, or Firm*—Gibb I.P. Law Firm, LLC; Richard M. Kotulak, Esq.

(57) ABSTRACT

The methodology disclosed herein calculates the dates that product must come to stock for every component in the supply chain as needed to meet exit demands associated with a plurality of due dates and priorities. Every planned product stock is thus associated with multiple stock dates and associated priorities as is every planned manufacturing start and every shipment.

18 Claims, 7 Drawing Sheets

METHOD FOR CALCULATING A MATERIALS REQUIREMENTS PLAN FOR DEMANDS CONTAINING MULTIPLE DEMAND DATES AND PRIORITIES

CROSS REFERENCE TO RELATED APPLICATIONS

The present application is related to U.S. patent application Ser. No. 11/278,817, filed concurrently herewith to Milne et al., entitled "Large Scale Supply Planning"; U.S. patent application Ser. No. 11/278,819, filed concurrently herewith to Degbotse at al., "Supply Consumption Optimization and Multiple Component Utilization"; U.S. patent application Ser. No. 11/278,821, filed concurrently herewith to Orzell and Patil, entitled, "A Method For Resource Allocation and Re-Grouping Recognizing Competing Priorities Which Vary By Date". The foregoing applications are assigned to the present assignee, and are all incorporated herein by reference

BACKGROUND OF THE INVENTION

1. Field of the Invention

The present invention relates to computer implementable decision support systems for resource allocation and for determining optimal supply chain plans based on multiple due date considerations. General methodologies within this field of study include advanced planning systems, optimization and heuristic based methods, constraint based programming, and simulation.

2. Description of the Related Art

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming or heuristic methods.

The below-referenced U.S. Patents disclose embodiments that were satisfactory for the purposes for which they were intended. The disclosures of both the below-referenced prior U.S. Patents, in their entireties, are hereby expressly incorporated by reference into the present invention for purposes including, but not limited to, indicating the background of the present invention and illustrating the state of the art: U.S. Pat. No. 5,971,585, "Best can do matching of assets with demand in microelectronics manufacturing," Oct. 26, 1999; U.S. Pat. No. 6,701,201, "Decomposition System and Method for Solving a Large-Scale Semiconductor Production Planning Problem," Mar. 2, 2004; U.S. Patent Application 20050171824US1, "Method for simultaneously considering customer commit dates and customer request dates," Aug. 4, 2005; and U.S. Patent Application 20020198757US1, "Method for allocating limited component supply and capacity to optimize production scheduling," Dec. 26, 2002.

SUMMARY OF INVENTION

The methodology disclosed herein calculates the dates that product must come to stock for every component in the supply chain as needed to meet exit demands associated with a plurality of due dates and priorities. Every planned product stock is thus associated with multiple stock dates and associated priorities as is every planned manufacturing start and every shipment. More specifically, the present inventive methodology provides a method to calculate and carry independent multiple stock dates and associated priorities through the following processes:

i. Bill of material explosion where components required to meet assemblies are calculated.
ii. Shipments from one location to another as well as shipments to the final customer.
iii. Calculation of required manufacturing production starts necessary to support required stock requirements.
iv. Substitutions where one part number may substitute for another.
v. Binning processes in which a part is tested and then graded into separate bins based on the results of the test.

For products requiring lotsizing, the method provides for calculation of valid lotsized manufacturing releases such that sub-elements of the lot covering different demand due dates and priorities are preserved and identifiable.

The disclosed methodology provides advantages over conventional methods because the present method provides a Material Requirements Plan whose output creates planned supply chain stock information containing a multitude of calculated required stock dates for each required component corresponding to exit demands each having a multitude of due dates and linked priorities, such solutions handling binning, substitution, and/or lotsizing. In providing such information to people and systems who execute product build and movement, such information can be used to make more appropriate choices when to ship product based on the multiple shipdates associated with different priorities created by the method and make more appropriate choices on what priority must be given when manufacturing production starts must go through constrained processes.

Furthermore, if the MRP is being used to set a base for another process which will create a feasible plan, the output of the MRP provides a basis for such a system to prioritize the sequence of what gets supplied when by considering a multitude of due dates and priorities at each step of the bill of material consistent with due dates and priorities associated with end customer demand.

DETAILED DESCRIPTION

Figure 1:
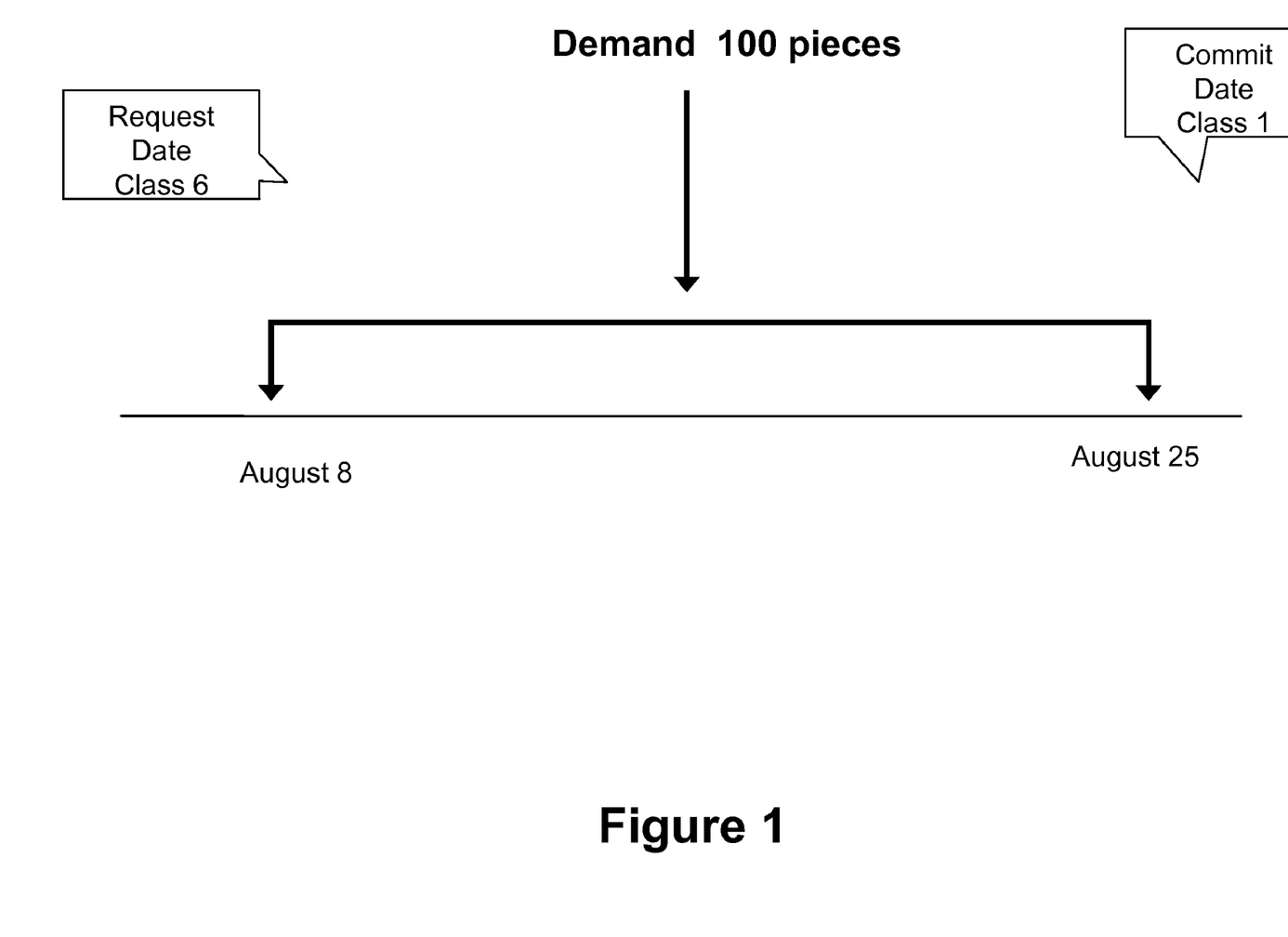
FIG. 1 is a schematic diagram showing an example of a demand with a request due date and a commit due date.

Supply chain planning involves the allocation of limited resources such as material inventories and capacities to best satisfy a prioritized demand statement. Competing needs for resources can be prioritized. However, the business priorities associated with a need can change as a function of when the need is satisfied. For example, FIG. 1 illustrates a demand for 100 pieces which has a requested delivery date of August $8^{th}$ and a committed delivery date of August $25^{th}$. In this example, previously the business committed to deliver the 100 pieces to the customer by August $25^{th}$ and presently the customer is requesting the pieces be delivered by August $8^{th}$. Because it is more important for the business to honor its previous commitment, the demand's commit date is assigned a more important priority (demand class 1) than the demand's request date (demand class 6). In general, a need may not be particularly important at the moment but may become critically important if the need is not met by a certain date (e.g. completing a project by a certain date required by government regulations). The converse is also true in that certain business needs may be critical to be satisfied by a certain date but will lose value if the date is not met (e.g. being first to market). In fact, any given need for a supply may have multiple independent dates associated with it such that supplying the need by those dates would have different value (importance) to the enterprise and hence should be associated with different priorities which either increase or decrease in importance as a function of the delivery date. The invention described solves the problem of how to generate a Materials Requirements Plan when priorities associated with the need change as a function of when the need is satisfied.

In many industries, a given customer demand may have a plurality of demand due dates and priorities associated with it. One example might be an industry with long lead times.

In such an industry, a customer may contact a supplier to obtain a commitment against a requested order. Depending on available supply, the supplier may not be able to satisfy the order when the customer requested it but will give the customer a committed supply due date that is later than the original request due date.

Businesses often generate a Materials Requirements Plan (MRP). An MRP is a plan that identifies all manufacturing production starts and shipments for the totality of components that are required to supply an end customer demand on time. Such a plan may be infeasible as a Materials Requirements Plan does not consider capacity for required components and the MRP output may produce schedules of activities which must be done in the past. The goal of an MRP is to inform the business of everything that must be done to satisfy all customer demands in an effort to potentially identify problem areas which would have to be resolved in order for the enterprise to supply all customer demands.

In addition to this business function, an MRP can also be used as a precursor step to generate a feasible plan which considers capacity and best supplies against customer demand. Conventional MRP is able to handle end customer demands associated with one demand due date. Conventional MRP does not address the situation where a given end customer demand may be associated with multiple independent due dates having multiple priorities. Thus, the output of a conventional MRP would not generate corresponding manufacturing production starts which would have a plurality of start dates and priorities associated with them corresponding to customer demands with a plurality of due dates and priorities.

Consistent with needs of the business discussed in the first paragraph above, it is advantageous for the presently disclosed MRP to appropriately consider end customer demands having a plurality of due dates and priorities and create outputs (e.g. production starts and ships) which correspondingly are associated with multiple due dates and priorities. In the example used above where a demand may have both a customer commit due date and customer request due date associated with it, if such information were associated with component production starts, a manufacturing line may be able to prioritize builds throughout the supply chain more appropriately to attempt to make customer request due date while not impacting customer commit due dates. Furthermore, such information would be very useful if an MRP was being used as a precursor to a system which uses MRP output to create a feasible plan. In addition, other business processes may exist where it is advantageous to associate any number of due dates and priorities with demands and have that information carry through the Materials Requirements Plan.

Thus, this invention allows calculation of a Materials Requirements Plan for demands containing a plurality of demand due dates and priorities and carrying this information throughout the supply chain. The method of this invention carries this information through to production starts for required components and shipments between plants for all levels of the bill of material such that each start and shipment will be associated with a multitude of due dates and associated priorities. Furthermore, the method described is robust enough to handle carrying such information through lotsizing processes and through binning and substitution processes.

The following patents (which are incorporated herein by reference) use MRP as a precursor to creating a feasible plan Dangat, G. S., Gokhale, A. R., Li, S., Milne, R. J., Orzell, R. A., Reid, R. L., Tang, X, and Yen, C., "Best can do matching of assets with demand in microelectronics manufacturing," U.S. Pat. No. 5,971,585. Oct. 26, 1999; and Hegde, S., Milne, R. J., Orzell, R. A., Pati, M., Patil, S., "Decomposition System and Method for Solving a Large-Scale Semiconductor Production Planning Problem," U.S. Pat. No. 6,701,201. Mar. 2, 2004. Additionally, U.S. Patent Publication Number 2005/0177465 which is Orzell et al., "Method for identifying product assets in a supply chain used to satisfy multiple customer demands," publication due date: Aug. 11, 2005, (which is also incorporated herein by reference) discloses methods which in a post process to a planning engine attempts to associate production starts and shipments with end demands that they will cover. However, the above methods differ from this present method in that the above methods have no references or methods to associate production starts or shipments to demands each with a plurality of independent due dates and priorities. Further, by nature of the problem being solved, the methods provide different results when applied around binning points, even when applied to the case where each demand has a single due date associated with it.

The invention contains methods to consider exit demands each associated with a plurality of due dates and priorities and perform necessary calculations to propagate such information in a Materials Requirements Plan. Hence there will be multiple stock dates with associated priorities computed for each planned component in the MRP output.

Figure 2:
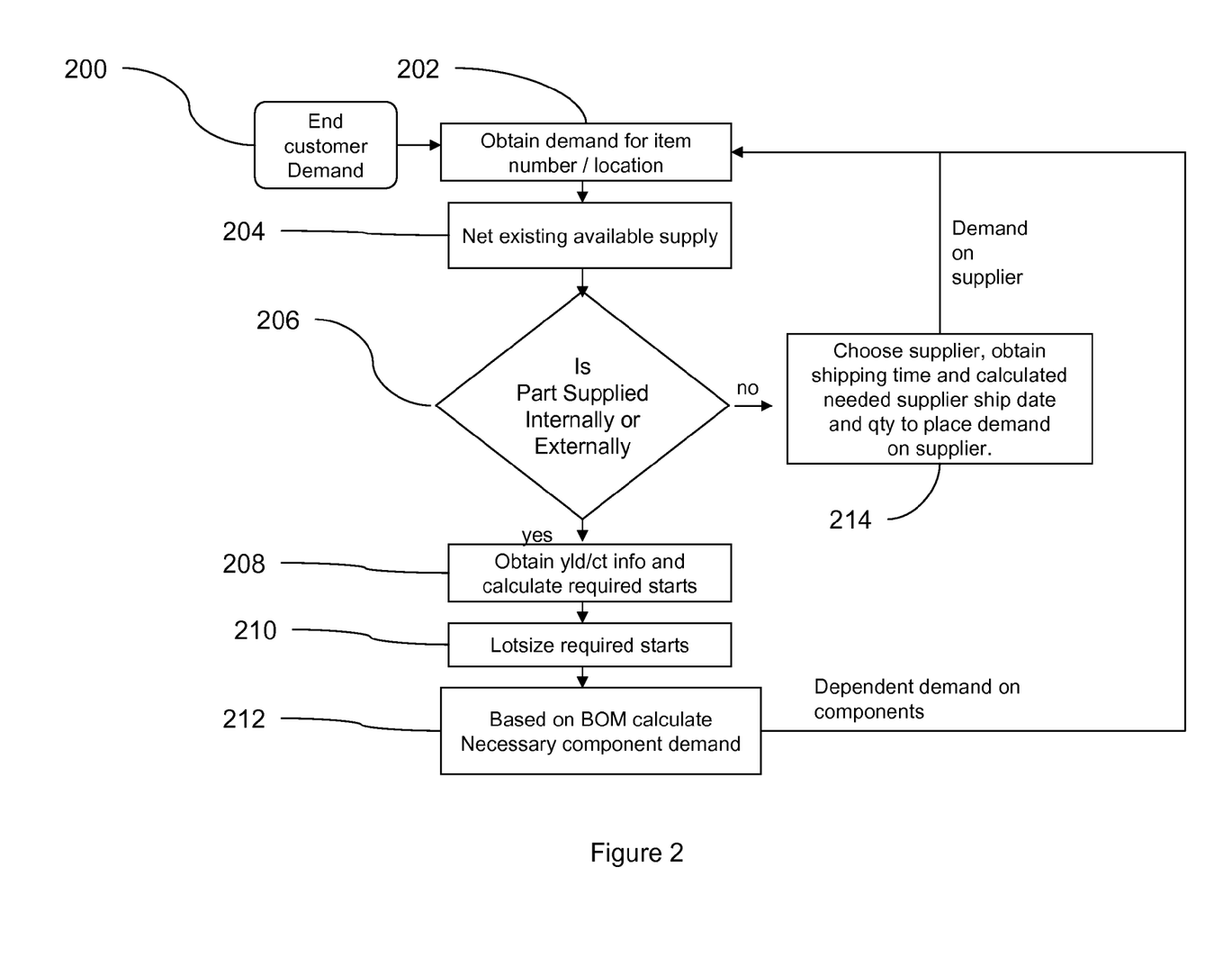
FIG. 2 is a flow diagram illustrating one method embodiment of the invention.

One embodiment of the invention is shown in flowchart form in FIG. 2. In item 200, end customer demand is fed as input into the MRP. In item 202, the MRP obtains demand employing a method which understands that each demand will be associated with a plurality of due dates and corresponding priorities. Thus, in item 200, there is presented a method to obtain demands, each of which is associated with a plurality of due dates and priorities. In this method, MRP processing proceeds with the understanding that any demand can be associated with a plurality of due dates and associated priorities. Any systems supporting this method allow for reading and storing the multiplicity of due dates and priorities as required by this invention.

In item 204, the MRP nets available supply against the demand. The following processing is performed assuming that not enough supply exists to cover the demand. In item 206, the method determines if the item is to be supplied internally or externally. Internally means, the same plant will make the part. Externally means the part will be supplied from another plant. If the part is built internally, processing proceeds to item 208 in which the method obtains corresponding yields and cycle times and determines when (and the quantity of) manufacturing production starts that must be built to cover the corresponding demand. In item 208, the method associates a plurality of start dates and associated priorities with each calculated production start corresponding to the plurality of due dates and associated priorities of the demands that are covered by the production start. Item 208 is explained in greater detail with respect to the discussion of FIG. 3, below.

In item 210, the method adjusts the sizes of the production lots (e.g., lotsizes the calculated production starts) by combining/splitting them into quantities for best manufacturing efficiency. The method ensures that the lotsize process considers and appropriately preserves the plurality of dates and priorities which must be passed to downstream processes. This is explained in greater detail below in the discussion of FIG. 5.

Figure 6:
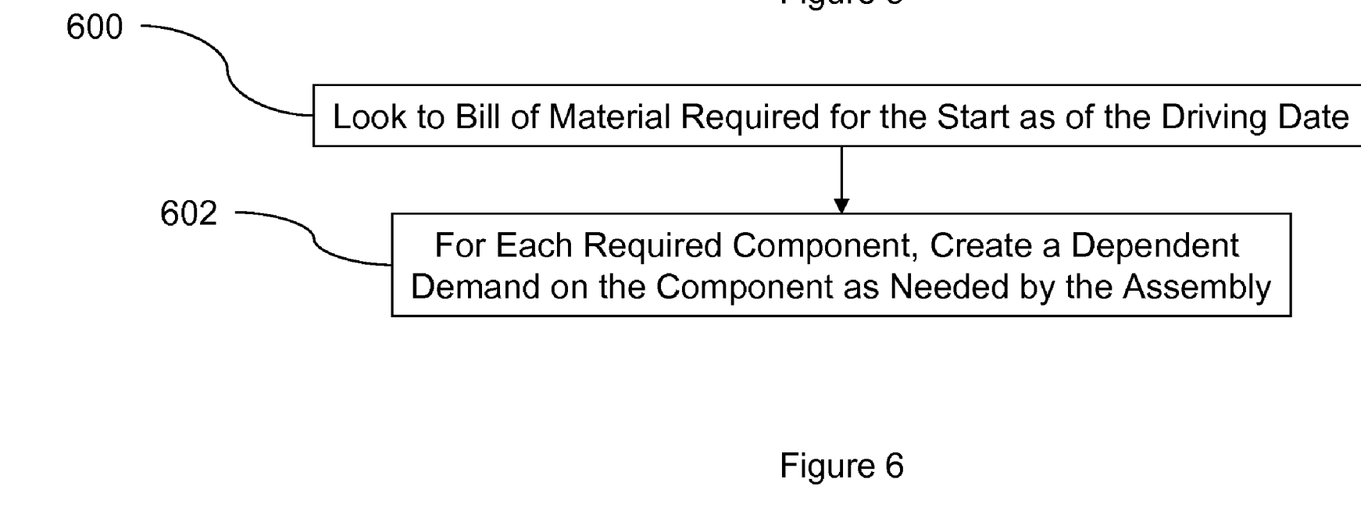
FIG. 6 is a flow diagram illustrating a method to calculate and carry multiple due dates and priorities for components required to build assemblies.
Figure 7:
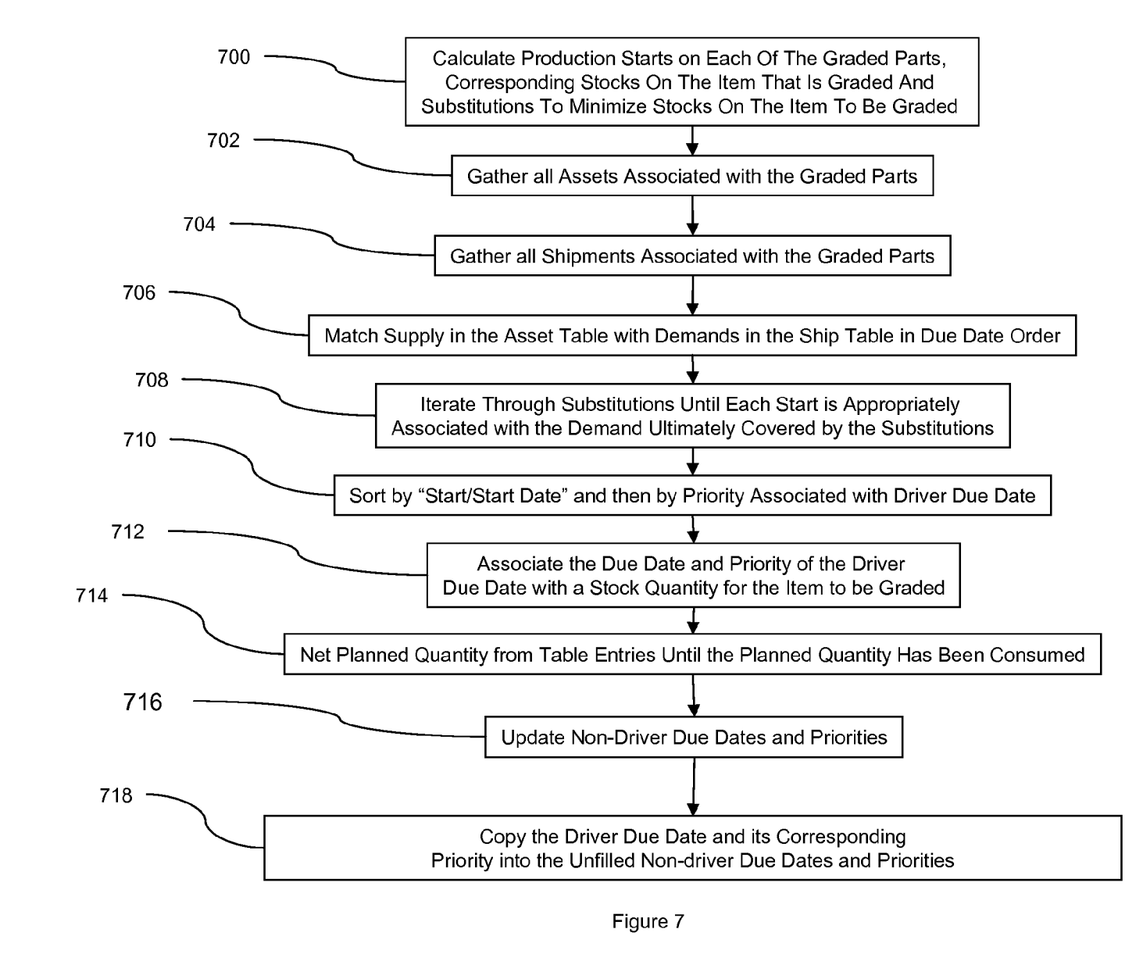
FIG. 7 is a flow diagram illustrating is a method to calculate and carry multiple due dates and priorities for production that is binned or where substitutions can occur.

In item 212, if the calculated production start requires components in order to build it, the method calculates dependent demand to drive the supply of those components. This dependent demand ultimately is returned to the MRP for further processing. In item 212, the method passes multiple due dates and priorities on to the component demands corresponding to the plurality of start dates and priorities associated with the start. This is explained more fully in FIGS. 6 and 7 below. FIG. 7 covers the especially challenging case where binning and substitution take place.

Figure 4:
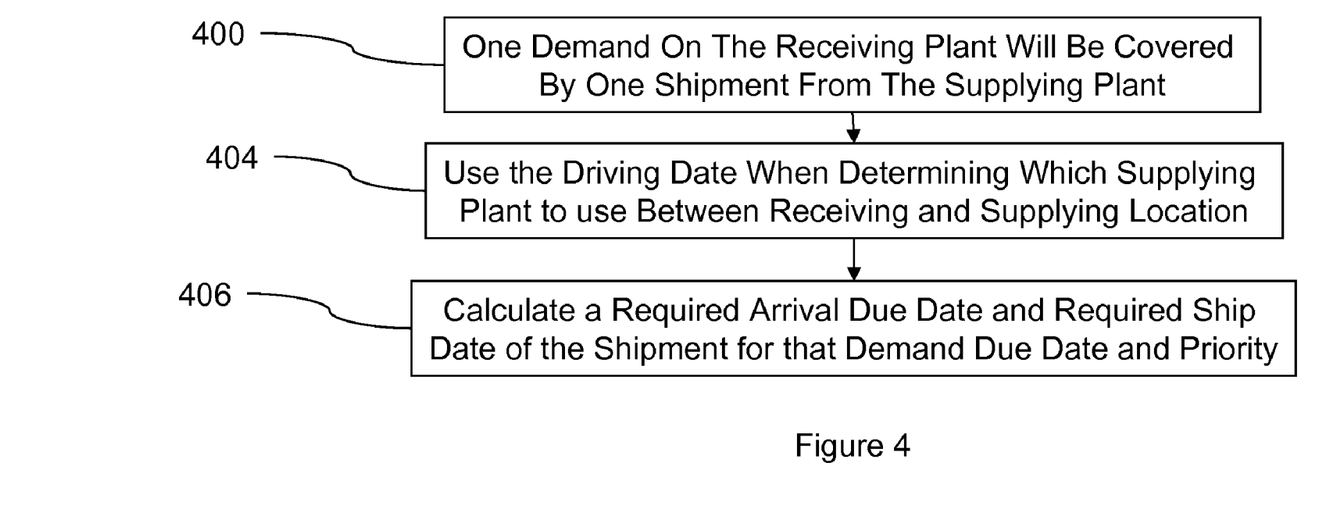
FIG. 4 is a flow diagram illustrating a method to calculate shipments between locations.

In item 214, if the part is built externally, the method chooses a supplier, finds the shipping time between the supplier and the receiver, calculates when and how much the supplier must supply, and places this demand onto the MRP for processing in a subsequent iteration. In item 214, the method passes a demand with a plurality of due dates and associated priorities corresponding to netted demands to the supplier. The processing in item 214 is shown in FIG. 4 and discussed below. Furthermore, it may be desirable that the shipments from suppliers be lotsized, as explained in the discussion of FIG. 5.

Figure 3:
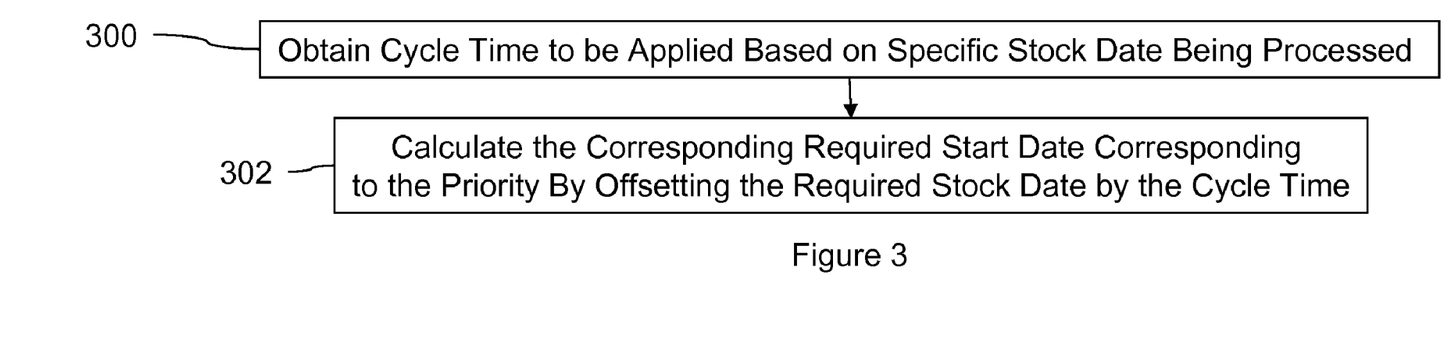
FIG. 3 is a flow diagram illustrating a method to calculate required manufacturing production starts.
Figure 5:
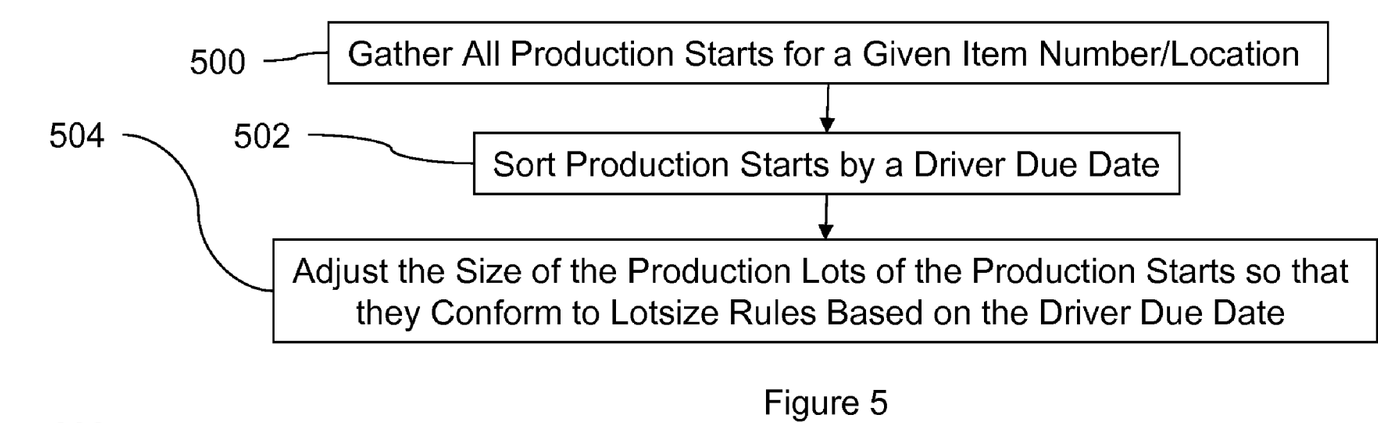
FIG. 5 is a flow diagram illustrating a method to calculate and carry multiple due dates and priorities through points in the manufacturing line.

Thus, FIGS. 3-7 below illustrate the following aspects of the invention. FIG. 3 illustrates a method to calculate required manufacturing production starts such that planned production starts carry multiple due dates and priorities; FIG. 4 discloses a method to calculate shipments between locations such that planned shipments carry multiple due dates and priorities; Shown in FIG. 5 is a method to calculate and carry multiple due dates and priorities through points in the manufacturing line which have a lotsizing process where required production starts to support exit demand can be combined or broken up to fit lotsizing requirements. FIG. 6 demonstrates a method to calculate and carry multiple due dates and priorities for component demands required to build assemblies each having multiple due dates and priorities. In FIG. 7, illustrated is a method to calculate and carry multiple due dates and priorities through binning points where, in addition to a test and grading process, substitutions where one item number can be used in place of another can take place. While the present disclosure illustrates how each of the foregoing is used in a specific combination, each process/method stands on its own and any combination of such elements or one, some, or all can be used to achieve any specific desired goal.

Each of the methods disclosed below concerns itself with appropriately calculating MRP planning data throughout the supply chain when multiple due dates and priorities are associated with demand or stock quantities. Many of the methods make use of the fact that one of the set of due dates can be chosen as a "driving" date. For most business applications, this will usually be the due date associated with the most important priority although the methods do not preclude other methods being used for choosing a driving date. The driving date is the due date that is considered the most critical due date that has to be met in terms of driving the path of supply that must be built to supply demand. In the methods below, where use of differing due dates would cause alternate planning paths and parameters to be chosen when creating the Materials Requirements Plan, the methods choose to use the paths associated with the driving date as the due date chosen to be the most important due date of the plurality of due dates associated with a particular demand or stock quantity.

Thus, FIG. 3 illustrates a method to calculate required manufacturing production starts such that planned production starts carry multiple due dates and priorities. Traditional MRPs calculate a required manufacturing start date by obtaining a given required stock date and offsetting the stock date by cycle time to calculate the corresponding required start date. This method extends this traditional MRP method by allowing for the required stock to be associated with multiple due dates with multiple priorities. For each required stock and for each stock date and associated priority associated with the stock, the method obtains cycle time to be applied based on the specific stock date being processed in item 300 (a driving date is not required for this process) and, in item 302 calculates the corresponding required start date corresponding to the priority by offsetting the required stock day by the cycle time found in item 300. After looping through each due date and priority associated with the required stock, the method creates a corresponding start with a multitude of start dates and priorities corresponding in a 1 to 1 manner with the multitude of stock dates and priorities of the required stock.

FIG. 4 illustrates a method to calculate shipments between locations such that planned shipments carry multiple due dates and priorities and providing corresponding multiple shipping dates with associated priorities. Satisfying end customer demands often requires transfer of either end item or component parts from one plant to another in the supply chain. A traditional MRP calculates shipments which need to be received from a supply plant to satisfy demands on the item at the receiving location. In this method, the traditional MRP calculation are extended by associating the calculated planned shipment with multiple ship dates and priorities to multiple demand due dates and priorities associated with the demands on the receiving plant.

More specifically, as with conventional MRP processing, it is assumed that there is an unsatisfied demand on an item in the receiving location which needs to be satisfied through a shipment from a supplying plant. For this method, in item 400, it is assumed that one demand on the receiving plant will be covered by one shipment from the supplying plant. The case where one shipment can cover one or more demands or conversely one demand can be covered by one or more shipments is covered in the method shown in FIG. 5, which is discussed below. In item 404, the driving date (discussed earlier) is used when determining which supplying plant to use between receiving and supplying location. In item 406, for each demand due date and priority associated with the demand to be covered by the shipment from the supplying location, the method calculates a required arrival due date and required ship date of the shipment for that demand due date and priority. Item 406 results in multiple due dates and priorities being associated with a single shipment corresponding to the multiple due dates and priorities associated with the demand the shipment is supplying.

FIG. 5 illustrates a method to calculate and carry multiple due dates and priorities through points in the manufacturing line which have a lotsizing process where required production starts to support exit demand can be combined or broken up to fit lotsizing requirements. In many points in the manufacturing line, product can be lotsized. For example, manufacturing production starts and shipments can both be lotsized. Lotsizing means combining or splitting required production starts or shipments to conform to given rules designed for manufacturing efficiency. For example, product may be manufactured or shipped with restrictions on minimum quantity or maximum quantity per lot. Some industries may have product where lots must be in multiples of a given quantity. Traditional MRP provides methods for either combining or splitting non-lotsized production starts or shipments to create a valid lot conforming to lotsize rules associated with one due date and quantity. Such combining or splitting methods require processing production starts or shipments of a given item in start date or ship date order, respectively. Traditional MRP does not address how to handle lotsizing when the resultants must combine entities which have a multitude of due dates and corresponding priorities associated with them. This method goes beyond traditional MRP logic to carry multiple due dates and associated priorities through the combining and splitting that takes place in the lotsizing process.

For purposes of illustrating the inventive method, the following example refers to lotsizing manufacturing production starts below. However, as would be understood by one ordinarily skilled in the art, the method can equally be applied to all other MRP subjects, such as planned shipments between locations, etc. The method proceeds by performing the items shown in FIG. 5. In item 500, the method gathers all production starts for a given item number/location and, in item 502, sorts the production starts by a driver due date. In item 504, the method adjusts the size of the production lots (e.g., lotsizes the production starts) so that they conform to lotsize rules based on the driver due date using any acceptable lotsizing method known to the art. The method expands on conventional methodologies by calculating and carrying forward sub-elements of the lot associated with all of the due dates and priorities. The method is illustrated by the simple example below which is used only as an example to demonstrate the method where two due dates and priorities are associated with each start.

| Original unlotsized production starts | | | | |
|---|---|---|---|---|
| Quantity | Due date 1 | Priority 1 | Due date 2 | Priority 2 |
| 33 | 02/01 | 1 | 01/12 | 2 |
| 26 | 02/02 | 1 | 01/15 | 2 |
| 52 | 02/10 | 1 | 02/01 | 3 |
| 34 | 02/15 | 1 | 02/15 | 4 |

In this example, the method uses lotsize rules where production starts must be >=25, <=50 and in multiples of 25. Due date 1 represents the driver due date. The goal of the lotsizing method in this case is to combine quantities from the above table to create lots as close to 50 without going over. Production starts of 25 are permissible if production starts remaining to be combined have quantities <=25. The particular lotsizing methodology is unimportant. One benefit of the present method is the ability to apply lotsizing while preserving the original multiple start dates and priorities in the results. The following describes the steps for this.

Step 1.) If no unlotsized production starts remain, quit the process. Otherwise, proceed through remaining unlotsized production starts adding rows of production starts together until either the maximum is equaled or exceeded or no more production starts remain. If the maximum is achieved or exceeded, create a lotsized release of maximum keeping track of the individual rows which were used in creating the combined lot. If maximum is not reached, create a lot of the least size which respects minimum and multiple rules. Net the quantity of the lotsized release from the rows in the original unlotsized table. Associate a priority to the lotsized release created consisting of the highest priority associated with the driver due date from the rows used to create the lot. Similarly, associate a start date with the lot consisting of the earliest due date associated with the driver due date from the rows used to create the lot.

In this case, the method proceeds through rows 1 and 2. Adding the production starts of 33 and 26 together, the method gets 59 which exceeds the maximum of 50. The method creates a lotsized release of the maximum quantity following the rules of step 1 leaving the following:

| Lotsized releases (all associated with same Lot # represent sub-elements of same lot.) | | | | | | | | |
|---|---|---|---|---|---|---|---|---|
| Lot Priority | Lot Due date | Lot # | Lot Sub # | Sub Qnty | Due date 1 | Priority 1 | Due date 2 | Priority 2 |
| 1 | 02/01 | 1 | 1 | 33 | 02/01 | 1 | 01/12 | 2 |
|  |  |  | 2 | 17 | 02/02 | 1 | 01/15 | 2 |

Remaining unlotsized releases are as follows after netting of the lotsized release:

| Original unlotsized production starts | | | | |
|---|---|---|---|---|
| Quantity | Due date 1 | Priority 1 | Due date 2 | Priority 2 |
| 0 | 02/01 | 1 | 01/12 | 2 |
| 9 | 02/02 | 1 | 01/15 | 2 |

-continued

Original unlotsized production starts

| Quantity | Due date 1 | Priority 1 | Due date 2 | Priority 2 |
|---|---|---|---|---|
| 52 | 02/10 | 1 | 02/01 | 3 |
| 34 | 02/15 | 1 | 02/15 | 4 |

The method repeats step 1. In this case the method applies the method to rows 2 and 3 where production starts 9+52=61 exceed maximum. Applying the method as before the method gets:

Lotsized releases (all associated with same Lot # represent sub-elements of same lot.)

| Lot Priority | Lot Due date | Lot # | Lot Sub # | Sub Qnty | Due date 1 | Priority 1 | Due date 2 | Priority 2 |
|---|---|---|---|---|---|---|---|---|
| 1 | 02/01 | 1 | 1 | 33 | 02/01 | 1 | 01/12 | 2 |
|   |       |   | 2 | 17 | 02/02 | 1 | 01/15 | 2 |
| 1 | 02/02 | 2 | 1 | 9  | 02/02 | 1 | 01/15 | 2 |
|   |       |   | 2 | 41 | 02/10 | 1 | 02/01 | 3 |

Remaining unlotsized releases are as follows after netting of the lotsized release:

Original unlotsized production starts

| Quantity | Due date 1 | Priority 1 | Due date 2 | Priority 2 |
|---|---|---|---|---|
| 0  | 02/01 | 1 | 01/12 | 2 |
| 0  | 02/02 | 1 | 01/15 | 2 |
| 11 | 02/10 | 1 | 02/01 | 3 |
| 34 | 02/15 | 1 | 02/15 | 4 |

The method again repeats step 1. Proceeding through rows 3 and 4 the method combines production starts of 11+34=45 and then must stop as no more unlotsized production starts exist. The method creates a lotsized release of 50 as it is the smallest start >=45 which conforms to the minimum and multiple rule. As the method must build 50 to satisfy lotsize but only 45 are necessary, the method creates a row in the lotsized release table associated with the lot for 5 pieces with a flag that these pieces are unneeded except for lotsizing purposes. The method then obtains the following results:

Lotsized releases (all associated with same Lot # represent sub-elements of same lot.)

| Lot Priority | Lot Due date | Lot # | Lot Sub # | Sub Qnty | Due date 1 | Priority 1 | Due date 2 | Priority 2 |
|---|---|---|---|---|---|---|---|---|
| 1 | 02/01 | 1 | 1 | 33 | 02/01 | 1 | 01/12 | 2 |
|   |       |   | 2 | 17 | 02/02 | 1 | 01/15 | 2 |
| 1 | 02/02 | 2 | 1 | 9  | 02/02 | 1 | 01/15 | 2 |
|   |       |   | 2 | 41 | 02/10 | 1 | 02/01 | 3 |
| 1 | 02/10 | 3 | 1 | 11 | 02/10 | 1 | 02/01 | 3 |
|   |       |   | 2 | 34 | 02/15 | 1 | 02/15 | 4 |
|   |       |   | 3 | 5  | unneeded | | unneeded | |

Remaining unlotsized releases are as follows after netting of the lotsized release:

Original unlotsized production starts

| Quantity | Due date 1 | Priority 1 | Due date 2 | Priority 2 |
|---|---|---|---|---|
| 0 | 02/01 | 1 | 01/12 | 2 |
| 0 | 02/02 | 1 | 01/15 | 2 |
| 0 | 02/10 | 1 | 02/01 | 3 |
| 0 | 02/15 | 1 | 02/15 | 4 |

The method again repeats step 1. As there are no more remaining unlotsized production starts, the process stops. Therefore, in this example the final output of step 1 is:

Lotsized releases (all associated with same Lot # represent sub-elements of same lot.)

| Lot Priority | Lot Due date | Lot # | Lot Sub # | Sub Qnty | Due date 1 | Priority 1 | Due date 2 | Priority 2 |
|---|---|---|---|---|---|---|---|---|
| 1 | 02/01 | 1 | 1 | 33 | 02/01 | 1 | 01/12 | 2 |
|   |       |   | 2 | 17 | 02/02 | 1 | 01/15 | 2 |
| 1 | 02/02 | 2 | 1 | 9  | 02/02 | 1 | 01/15 | 2 |
|   |       |   | 2 | 41 | 02/10 | 1 | 02/01 | 3 |
| 1 | 02/10 | 3 | 1 | 11 | 02/10 | 1 | 02/01 | 3 |
|   |       |   | 2 | 34 | 02/15 | 1 | 02/15 | 4 |
|   |       |   | 3 | 5  |       |   | unneeded | unneeded |

Thus, the step 1 process lotsizes production starts and creates a lot start date and lot priority for a lot while retaining all the individual multiple start dates and priorities associated with a lot. The quantity associated with a lot is the sum of all sub-quantities associated with the same lotnumber. At this point in the method, reporting is possible identifying the sub-quantities with corresponding priorities and due dates that make up the lot.

Step 2.) There is one more step that is performed in this process. The method demonstrated so far has taken production starts input where production starts are associated with 2 due dates and priorities and ended up with production starts which are associated with 3 due dates and priorities, the extra due date being for the due date and priority associated with the lot itself in addition to what is in its sub-components. In general if the input production starts had n-tuple due dates associated with it, the method so far would have created production starts with (n+1)-tuple due dates. Although, this (n+1)-tuple information may be useful for reporting purposes, the present lotsize process must finally produce production starts with the same number of n-tuples of due dates as its inputs as this will be expected by downstream MRP processes. The final process in the method thus converts the results of lotsizing back to production starts with the correct n-tuples of due dates which can be subsequently processed correctly by downstream MRP processes. The present lotsizing process required that one of the due dates in the n-tuple be identified as a driver due date. (In the present example, the driver due dates were the due dates under the Due date 1 column.) As the present process drove lotsizing to group correctly to the driver due dates, the method now creates lotsized production starts, each containing n-tuples of due dates, by substituting the lot due dates and priorities for the driver due date and priorities and eliminating any separate references to the lot due dates or priorities. Downstream MRP processes will thus drive to make shipments, components, downstream production starts for enough product to meet the lotsizing requirements of the driving date. Using the output from the present example for the previous step, by applying this final process, the method obtains the following.

Change driver due date Due date1 due dates and priorities to match the lot due date and priorities:

Lotsized releases after conversion of driving date and priority to lot due date and priority. Lot information can be ignored from this point on in downstream MRP processes.

| Lot Priority | Lot Due date | Lot # | Lot Sub # | Sub Qnty | Due date 1 | Priority 1 | Due date 2 | Priority 2 |
|---|---|---|---|---|---|---|---|---|
| 1 | 02/01 | 1 | 1 | 33 | 02/01 | 1 | 01/12 | 2 |
|   |       |   | 2 | 17 | 02/01 | 1 | 01/15 | 2 |
| 1 | 02/02 | 2 | 1 | 9  | 02/02 | 1 | 01/15 | 2 |
|   |       |   | 2 | 41 | 02/02 | 1 | 02/01 | 3 |
| 1 | 02/10 | 3 | 1 | 11 | 02/10 | 1 | 02/01 | 3 |
|   |       |   | 2 | 34 | 02/10 | 1 | 02/15 | 4 |
|   |       |   | 3 | 5  | 02/10 | 1 |       | unneeded |

Final lotsized results for downstream processing does not include separate lot information:

Lotsized production starts from Due date 1 as driver due date perspective

| Quantity | Due date 1 | Priority 1 | Due date 2 | Priority 2 |
|---|---|---|---|---|
| 33 | 02/01 | 1 | 01/12 | 2 |
| 17 | 02/01 | 1 | 01/15 | 2 |
| 9  | 02/02 | 1 | 01/15 | 2 |
| 41 | 02/02 | 1 | 02/01 | 3 |
| 11 | 02/10 | 1 | 02/01 | 3 |
| 34 | 02/10 | 1 | 02/15 | 4 |
| 5  | 02/10 | 1 |       | unneeded |

Note that the output of this process contains sufficient information so that the same process can be applied to the output to lotsize to a different driving date. Should the method have needed to do so, the method could have taken the output of this process and using the same method re-lotsized to using due date 2 as the driving date. Hence, based on user rules, the method can be applied to lotsize based on one of the n-tuples of due dates or another due date or by repeated use of the method where the output of one iteration feeds another, the method can be used to simultaneously lotsize from the viewpoint of all of the n-tuples of due dates. At this point the start information contains information to appropriately drive downstream MRP processes to provide enough material to meet lotsizing needs.

FIG. 6 demonstrates a method to calculate and carry multiple due dates and priorities for components required to build assemblies each having multiple due dates and priorities. Given a planned start for an assembly requiring components, this method will carry multiple start dates and priorities associated with the start to become multiple due dates and priorities associated with corresponding dependent demand on the components needed for the start. The method comprises, for each planned start, the following processes shown in FIG. 6. In item 600, the method looks for Bill of Material (BOM) required for the start as of the driving date. The driving date can be any due date the user picks but is usually the most critical due date. If lotsizing is employed and a single driving date is used in that process (see FIG. 5 above) it would normally be expected that the same driving date is used to obtain the bill of material.

In item 602, if the BOM shows components are required, for each required component, the method creates a dependent demand on the component as needed by the assembly. The method will place a corresponding demand due date and priority for each start date and priority associated with the assembly start in a 1 to 1 manner. The specifics of how to create a dependent demand due date on a component corresponding to an assembly start is well known in the art. This method differs from conventional methods because this method is applied to each of the multiple due dates and priorities associated with the assembly start. The result is a single component demand associated with multiple demand due dates and priorities corresponding to the multiple start dates and priorities associated with the corresponding assembly start. Note that the methods shown in FIG. 6 do not apply if the start is derived from a binning process. Instead, FIG. 7 below describes the method to follow if such is the case.

Again, FIG. 7 illustrates the method to calculate and carry multiple due dates and priorities through binning points where test and grading processes take place, additionally supporting substitutions where one item number can be used in place of another. In several industries, at certain points in the supply chain, items are tested and graded into different items depending on the results of the test. This process is often called binning or sorting. An example of such a process exists in the semi-conductor industry where a chip is tested and graded according to speed. Often times, the results of this binning process create items which can be substituted for one another. For example, in the semi-conductor industry a higher speed chip can often be substituted for a slower speed chip.

In a traditional MRP, the graded parts that are the results of the binning process have needed production starts consisting of a single due date and quantity and the MRP has to calculate the stock that has to be tested to support required graded production starts. This invention expands on this to provide a method to handle the much more complicated case where each of the graded production starts have multiple start dates and priorities associated with them and may in a user selectable manner be substituted for one another. This method calculates the correct multiple due dates and priorities to associate with the stock to be tested and graded so that the due dates and priorities associated with the stock are consistent with graded items which will consume the stock.

It should be noted that the stock quantity of a part that is to be graded may supply the needs of multiple n-tuples of demand due dates and priorities. The method therefore defines what are the "correct" demand due dates and priorities to be associated with a quantity that is to undergo a binning process. Take a simple example where there is only one due date field and one priority. Say 60% of PN1 becomes PN2 and 40% of PN1 becomes PN3 as a result of the binning process. Say the method builds 100 pieces of PN1 which becomes 60 pieces of PN2 which is used to cover a priority 1 demand and which becomes 40 pieces of PN3 which is used to cover a priority 2 demand. What is the priority to be associated with the 100 pieces of PN 1? Mathematically, 100 pieces of PN1 are required to support the 60 piece priority 1 PN2 demand and the same 100 pieces of PN1 are required to support the 40 piece priority 2 PN3 demand. For MRP purposes, the method associates the 100 pieces of PN1 with the highest priority demand being covered. When multiple due dates and quantities are involved, the method requires that a driver due date and priority be selected. When a binned start covers multiple priorities associated with a driver due date, like the example above, the method will associate the highest priority with the item to be binned. For all other non-driver due dates and priorities that are being supplied by the quantity that is to be binned, when the quantity to be binned covers multiple due dates and priorities, the method will associate the quantity with the earliest corresponding due dates and highest priorities being supplied by the quantity to be binned.

The method is illustrated by a simple example showing a single start which bins into two other parts where the method does a single simple substitution. The method describes a process where item PN1 is tested and graded. Statistically, the method plans for 60% of PN1 being graded to become PN2 and 40% of PN1 being graded to become PN3. The example being illustrated allows item PN3 to substitute for item PN2.

Items PN2 and PN3 have the following demand due dates and corresponding priorities associated with them.

Demands on graded items with associated due dates and priorities

| Item | Dem # | Quantity | Due date 1 | Priority 1 | Due date 2 | Priority 2 |
|------|-------|----------|------------|------------|------------|------------|
| PN2  | DEM1  | 70       | 02/01      | 1          | 01/15      | 5          |
| PN3  | DEM2  | 30       | 02/01      | 2          | 01/10      | 4          |

The method shown in FIG. 7 proceeds in the following manner. In item 700, as a starting point, the method first solves the above system to calculate production starts on each of the graded parts, calculate corresponding stocks on the item that is graded and calculate substitutions to minimize stocks on the item to be graded solely using the driver due date for the calculations. Such solutions, using single dates for each start and stock, represent conventional art and can be made heuristically or more appropriately employing linear programming. U.S. Pat. Nos. 5,971,585 and 6,701,201 (incorporated herein by reference) describe a linear programming solution to the problem.

For the present illustration, the optimal way to solve the system is to build 100 pieces of PN1 on 02/01 which then is graded into 60 pieces of PN2 and 40 pieces of PN3. The method then substitutes 10 pieces of PN3 for PN2. This is illustrated in the table below where Start, Start Qty, Stock Qty and Stock date represent assets which add to inventory, Demand, Demand Qty and Demand Due date represent shipments or consumption of inventory and Ending Inventory represents ending inventory as of the due dates indicated. Solely for ease of illustration, the method assumes the graded items have 100% yield and zero cycle time.

Solution Table

| Start  | Start Qty | Stock Qty | Stock date | Demand  | Demand Qty | Demand Due date | Ending Inventory |
|--------|-----------|-----------|------------|---------|------------|-----------------|------------------|
| PN2    |           |           |            |         |            |                 |                  |
| PL0001 | 60        | 60        | 02/01      |         |            |                 |                  |
| SUB001 | 10        | 10        | 02/01      | DEM1    | 70         | 02/01           | 0                |
| PN3    |           |           |            |         |            |                 |                  |
| PL0001 | 40        | 40        | 02/01      | SUB001  | 10         | 02/01           | 30               |
|        |           |           |            | DEM2    | 30         | 02/01           | 0                |

-continued

Solution Table

| Start  | Start Qty | Stock Qty | Stock date | Demand       | Demand Qty | Demand Due date | Ending Inventory |
|--------|-----------|-----------|------------|--------------|------------|-----------------|------------------|
| PN1    |           |           |            |              |            |                 |                  |
| BIN001 | 100       | 100       | 02/01      | PL0001-PN2   | 60         | 02/01           | 60               |
|        |           |           |            | PL0001-PN3   | 40         | 02/01           | 0                |

The present method now needs to associate a multitude of due dates and priorities to PN2 production starts PL0001, PN3 production starts PL0001 and PN1 stocks PL0001-PN2 and PL0001-PN3.

Next in item 702, the method gathers all assets associated with the graded parts. This corresponds to the portion of the tables associated with "Start, Start Qty, Stock Qty and Stock date" and sort by item stock date.

Asset Table

| Item | Start  | Start Qty | Stock Qty | Stock date |
|------|--------|-----------|-----------|------------|
| PN2  | PL0001 | 60        | 60        | 02/01      |
| PN2  | SUB001 | 10        | 10        | 02/01      |
| PN3  | PL0001 | 40        | 40        | 02/01      |

In item 704, the method gathers all ships (or consumption) associated with the graded parts. This consists of original demands with associated due dates and priorities plus any substitutions appearing the solution table above. Note, that at this stage of the process, the method has no knowledge of priorities associated with substitutions.

Ship Table

| Item | Dem #  | Quantity | Due date 1 | Priority 1 | Due date 2 | Priority 2 |
|------|--------|----------|------------|------------|------------|------------|
| PN2  | DEM1   | 70       | 02/01      | 1          | 01/15      | 5          |
| PN3  | SUB001 | 10       | 02/01      | N/A        | N/A        | N/A        |
| PN3  | DEM2   | 30       | 02/01      | 2          | 01/10      | 4          |

In item 706, for each graded part, the method matches supply in the asset table with demands in the ship table in due date order using the stock dates in the Asset Table and driver due date (Due date 1) in the Ship Table. The table below shows how the results of this mapping for the example data our illustration has been using.

Match table

| Item | Start  | Start Qty | Stock Qty | Stock date | Dem #  |
|------|--------|-----------|-----------|------------|--------|
| PN2  | PL0001 | 60        | 60        | 02/01      | DEM1   |
| PN2  | SUB001 | 10        | 10        | 02/01      | DEM1   |
| PN3  | PL0001 | 10        | 10        | 02/01      | SUB001 |
| PN3  | PL0001 | 30        | 30        | 02/01      | DEM2   |

At this point, if the method has an association between "PLxxxx" type production starts and demands of type "DEMx" then the method has an association between the "PLxxxx" production starts and the multitude of due dates and priorities associated with the "DEMx" type demands. However, the method does not without further work know what multitude of demands to associate with "PLxxxx" production starts covering "SUBxxx" type demands in the table. The method solves this by utilizing the correspondence between the "SUBxxx" demands which consume an asset for substitution and the "SUBxxx" assets which add assets to inventory. The method iteratively proceeds through the above table looking for demands of type "SUBxxx". When one is found with a non-zero quantity, the method looks for corresponding assets entries in the table. The method than adds entries to the table where the asset associated with the original SUBxxx demand becomes associated with the demands corresponding to assets currently matched where SUBxxx is an asset. The method then nets from the original table entry where the SUBxxx was found. The method repeats this until there are no more "SUBxxx" type demands with non-zero quantities. For example, row 3 above contains a demand of SUB001 The method looks in the table the table where assets of SUB001 are covering demands. In this case, 10 pieces of such an asset is covering demand DEM1. The method creates a new entry in the table with the original asset covering the SUB001 demand (PN3/PL0001) now covering the demand associated with SUB001 as an asset (DEM1) with a quantity containing the smaller of the quantity associated with demand row or the quantity associated with asset row. The method then nets this quantity from the original table entry with the SUB001 demand and the entry where SUB001 was an asset. This gives us the following result:

Match table

| Item | Start | Start Qty | Stock Qty | Stock date | Dem # |
|------|--------|-----------|-----------|------------|--------|
| PN2  | PL0001 | 60        | 60        | 02/01      | DEM1   |
| PN2  | SUB001 | 0         | 0         | 02/01      | DEM1   |
| PN3  | PL0001 | 0         | 0         | 02/01      | SUB001 |
| PN3  | PL0001 | 30        | 30        | 02/01      | DEM2   |
| PN3  | PL0001 | 10        | 10        | 02/01      | DEM1   |

Thus, item 708 of the method discovered in this example that, because of substitution, part of PN3 demand is used to supply demand DEM1 of PN2 and hence needs to be associated with the multitude of due dates and corresponding priorities associated with that demand. In general, item 708 iterates through substitutions until each start is appropriately associated with the demand ultimately covered by the substitutions. At that point, since the method knows the demand associated with each of the production starts, the method knows the due dates and priorities to associate with the production starts as shown in the table below. This table can now be saved as containing appropriate due dates and priorities associated with production starts resulting from the binning process of this particular Start/Start date.

Merge table with explicit due dates and priorities

| Item | Start  | Start Qty | Stock Qty | Stock date | Dem # | Due date 1 | Priority 1 | Due date 2 | Priority 2 |
|------|--------|-----------|-----------|------------|-------|------------|------------|------------|------------|
| PN2  | PL0001 | 60        | 60        | 02/01      | DEM1  | 02/01      | 1          | 01/15      | 5          |
| PN3  | PL0001 | 30        | 30        | 02/01      | DEM2  | 02/01      | 2          | 01/10      | 4          |
| PN3  | PL0001 | 10        | 10        | 02/01      | DEM1  | 02/01      | 1          | 01/15      | 5          |

At this point the method is able to associate the production starts of each graded product with appropriate multiple due dates and priorities corresponding to the demands that are being supplied. The method now needs to calculate the due dates and priorities to associate with the item to be graded (PN1) in item 710. To do so, in item 710, the method first sorts the above table by "Start/Start date" then by priority associated with driver due date. At the end of this step, the method will have successfully associated n-tuples of due dates and priorities with the production starts corresponding to the items which result after the grading process (PN2 and PN3, in the present example). In the present example, this step results in:

Merge table with explicit due dates and priorities

| Item | Start  | Start Qty | Stock Qty | Stock date | Dem # | Due date 1 | Priority 1 | Due date 2 | Priority 2 |
|------|--------|-----------|-----------|------------|-------|------------|------------|------------|------------|
| PN2  | PL0001 | 60        | 60        | 02/01      | DEM1  | 02/01      | 1          | 01/15      | 5          |
| PN3  | PL0001 | 10        | 10        | 02/01      | DEM1  | 02/01      | 1          | 01/15      | 5          |
| PN3  | PL0001 | 30        | 30        | 02/01      | DEM2  | 02/01      | 2          | 01/10      | 4          |

The method now calculates the n-tuple of due dates/priorities to place on the part which is being graded by this process (PN1 in the present example) in items 712-718. To more clearly illustrate the method, the illustration shown below shows an example where the lead times for the outputted graded parts are zero and where their yield is 100%. Often in reality the due dates associated with the item which is being graded will need to be offset by the cycle time of the graded parts and yield applied. This is easily accomplished by taking the merge table from item 710 above, offsetting each due date by cycle time to find due dates associated with start date and by using yielded start quantity in the processes below.

For each "Start/Start date", the method proceeds through the table in the order of sort provided by step 6 looking for non-zero entries. If no non-zero entry is found, this step ends. If a non-zero entry of quantity x is found, in item 712, the method creates a stock quantity for the item to be graded (where the stock quantity is x divided by planned distribution, where planned distribution is the planned percentage of the item to be graded that becomes the graded part found) and associates the due date and priority of the driver due date with this stock quantity. The method marks all other non-driver due dates and priorities marked as unfilled for now.

In item 714-718, for each graded product which is created from the graded process, the method calculates the planned quantity the graded products will receive as a result of binning the stock quantity of the item to be binned. More specifically, in item 714, the method proceeds through entries for the Start/Start date, netting this planned quantity from the table entries until the planned quantity has been consumed.

If during the netting process in item 714, a non-zero entry is found in the table, the method checks to see if any of the non-driver due dates currently associated with the stock quantity of the part to be graded need to be updated and updates the corresponding non-driver due date in the stock quantity record if there exists a non-driver due date in the Merge table above whose due date differs from the driver due date in Merge table row and the non-driver due date is earlier in time than the corresponding due date currently associated with the stock quantity of the item to be graded (in item 716). Similarly, in item 716, the method updates the corresponding priority in the stock quantity record if there exist a non-driver due date in the Merge table row whose due date differs from the driver due date in the Merge table row and the priority associated with the non-driver due date is more important than the priority currently associated with the corresponding non-driver due date in the stock quantity record associated with the item to be graded.

In item 718, if any of the non-driver due dates and corresponding priorities in the stock quantity record that was created remains unfilled, the method copies the driver due date and its corresponding priority into the unfilled non-driver due dates and priorities.

An example of the method shown in FIG. 7 proceeds as follows. With respect to item 712, the method finds the first non-zero entry in the first row of the Merge table above. The method calculates stock quantity for the part to be graded as 60/0.60=100. The method associates the corresponding driving date and priority of the Merge table row being processed with the driving date and priority of the stock quantity the method calculated on the part to be graded.

Stock quantity for item to be graded

| Item | Start | Stock Qty | Stock date | Due date 1 | Priority 1 | Due date 2 | Priority 2 |
|---|---|---|---|---|---|---|---|
| PN1 | BIN001 | 100 | 02/01 | 02/01 | 1 | unfilled | unfilled |

For item 714, for graded product PN2, 100*0.60=60 pieces need to be netted from the merge table. This quantity can be found from the first row in the table. The netting process leaves:

Merge table with explicit due dates and priorities

| Item | Start | Start Qty | Stock Qty | Stock date | Dem # | Due date 1 | Priority 1 | Due date 2 | Priority 2 |
|---|---|---|---|---|---|---|---|---|---|
| PN2 | PL0001 | 0 | 0 | 02/01 | DEM1 | 02/01 | 1 | 01/15 | 5 |
| PN3 | PL0001 | 10 | 10 | 02/01 | DEM1 | 02/01 | 1 | 01/15 | 5 |
| PN3 | PL0001 | 30 | 30 | 02/01 | DEM2 | 02/01 | 2 | 01/10 | 4 |

As due date 2 differs from Due date 1, item 716 is performed. As any due date is considered earlier than an "unfilled" due date, the method replaces the due date associated with due date 2 in the stock quantity record with this Due date 2 value. Similarly, the method replaces the Priority 2 field of the stock quantity record with the Priority 2 value from this row in the merge table giving:

Stock quantity for item to be graded

| Item | Start | Stock Qty | Stock date | Due date 1 | Priority 1 | Due date 2 | Priority 2 |
|---|---|---|---|---|---|---|---|
| PN1 | BIN001 | 100 | 02/01 | 02/01 | 1 | 01/15 | 5 |

Items 714 and 716 are repeated for graded part PN3. For graded product PN3, 100*0.40=40 pieces need to be netted from the merge table. The method first nets from the 10 pieces found in the second row of the merge table. This zeroes the merge table entry for the row and leaves 30 remaining to be netted from later table entries. As non-driver due date Due date 2 differs from the driver due date, the method checks to see if Due date 2 is earlier in time than the corresponding Due date 2 entry associated with the stock quantity in the Stock quantity table. That is not the case, so the method does not update the Stock quantity due dates. Similarly, there is no need to update the Priority 2 field of the stock quantity. This process leaves:

| Merge table with explicit due dates and priorities | | | | | | | | |
|---|---|---|---|---|---|---|---|---|
| Item | Start | Start Qty | Stock Qty | Stock date | Dem # | Due date 1 | Priority 1 | Due date 2 | Priority 2 |
| PN2 | PL0001 | 0 | 0 | 02/01 | DEM1 | 02/01 | 1 | 01/15 | 5 |
| PN3 | PL0001 | 0 | 0 | 02/01 | DEM1 | 02/01 | 1 | 01/15 | 5 |
| PN3 | PL0001 | 30 | 30 | 02/01 | DEM2 | 02/01 | 2 | 01/10 | 4 |

| Stock quantity for item to be graded | | | | | | | |
|---|---|---|---|---|---|---|---|
| Item | Start | Stock Qty | Stock date | Due date 1 | Priority 1 | Due date 2 | Priority 2 |
| PN1 | BIN001 | 100 | 02/01 | 02/01 | 1 | 01/15 | 5 |

The method now needs to net the remaining 30 pieces from PN3 entries in the Merge table. Row 3 of the merge table has 30 pieces. As non-driver due date Due date 2 differs from driver due date Due date 1 in the row, the method checks if the due date in Due date2 of the record is less than the Due date 2 entry associated with the stock quantity in the stock table. It is, so the method replaces Due date 2 in the stock quantity table with this earlier due date. Similarly, the method replaces Priority 2 in the stock quantity table with the higher priority found in the Due date 2 field of the Merge table entry being netted. This results in:

| Merge table with explicit due dates and priorities | | | | | | | | |
|---|---|---|---|---|---|---|---|---|
| Item | Start | Start Qty | Stock Qty | Stock date | Dem # | Due date 1 | Priority 1 | Due date 2 | Priority 2 |
| PN2 | PL0001 | 0 | 0 | 02/01 | DEM1 | 02/01 | 1 | 01/15 | 5 |
| PN3 | PL0001 | 0 | 0 | 02/01 | DEM1 | 02/01 | 1 | 01/15 | 5 |
| PN3 | PL0001 | 0 | 0 | 02/01 | DEM2 | 02/01 | 2 | 01/10 | 4 |

| Stock quantity for item to be graded | | | | | | | |
|---|---|---|---|---|---|---|---|
| Item | Start | Stock Qty | Stock date | Due date 1 | Priority 1 | Due date 2 | Priority 2 |
| PN1 | BIN001 | 100 | 02/01 | 02/01 | 1 | 01/10 | 4 |

In item 714, as all Merge table entries for the Start/Start date are all zero, the process stops for this particular Start/Start date. The Stock quantity information can now be saved as having the appropriate due dates and associated priorities to be associated with the stock quantity of the part to be graded for this particular Start/Start date.

Figure 8:
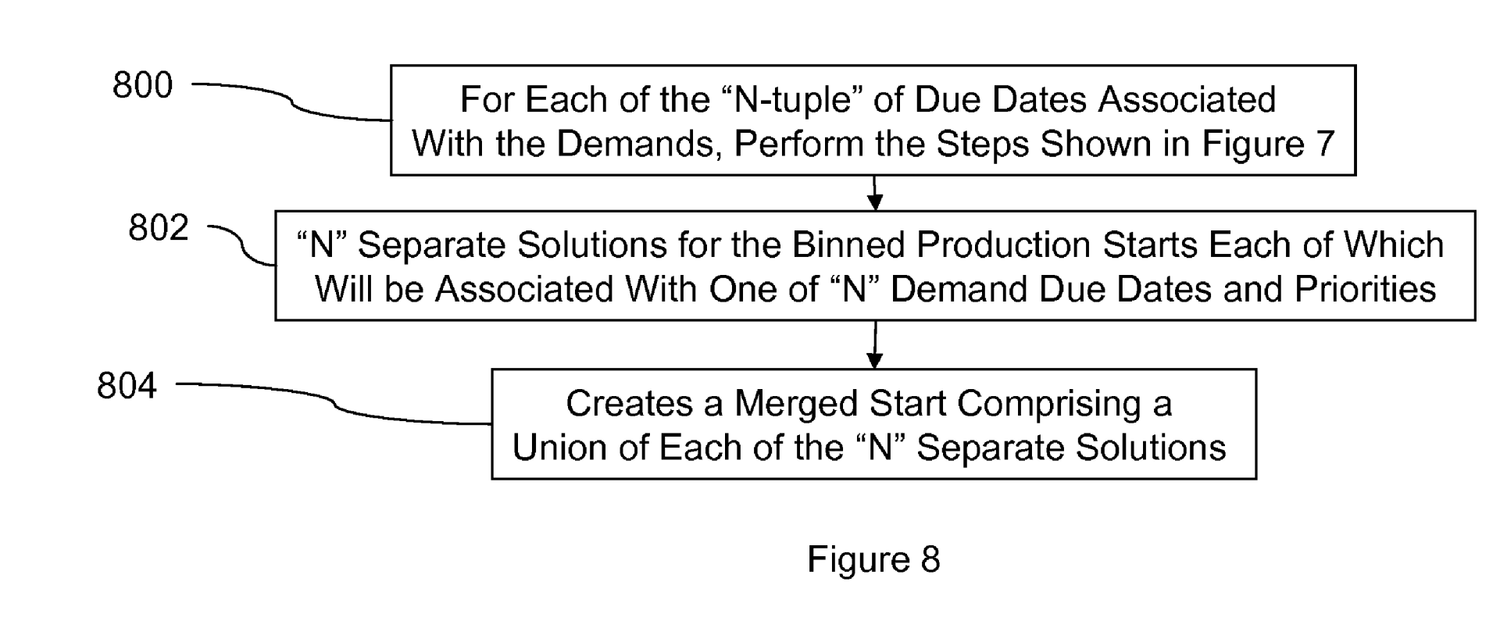
FIG. 8 is flow diagram illustrating a method to calculated production starts on the binned part without the assumption of a driving date.

This method assumed that one of the plurality of due dates associated with demands and production starts will be considered a driving date of most importance. An alternative embodiment, shown in FIG. 8, is also included herein to calculate production starts on the binned part without the assumption of a driving date. More specifically, in item 800, for each of the "n-tuple" of due dates associated with the demands, perform the steps shown in FIG. 7. However, only one due date will be associated with the binned production starts for each of these iterations. Therefore, in item 802, after the processing in FIG. 7 is completed, there will be "n" separate solutions for the binned production starts each of which will be associated with one of "n" demand due dates and priorities. Thus, in item 804, the method creates a merged start comprising a union of each of the "n" separate solutions (each of which is associated with one of "n" demand due dates and priorities).

An embodiment of the present invention has been programmed in C++ and implemented on an IBM P690 server with AFS for data storage and using the AIX operating system. It has also been implemented on HP-UX. It should be understood by those of ordinary skill in the art, however, that the present invention is not limited to the above implementation and is independent of the computer/system architecture. Accordingly, the present invention may equally be implemented on other computing platforms, programming languages, and operating systems, and also may be hardwired into a circuit or other computational component.

Figure 9:
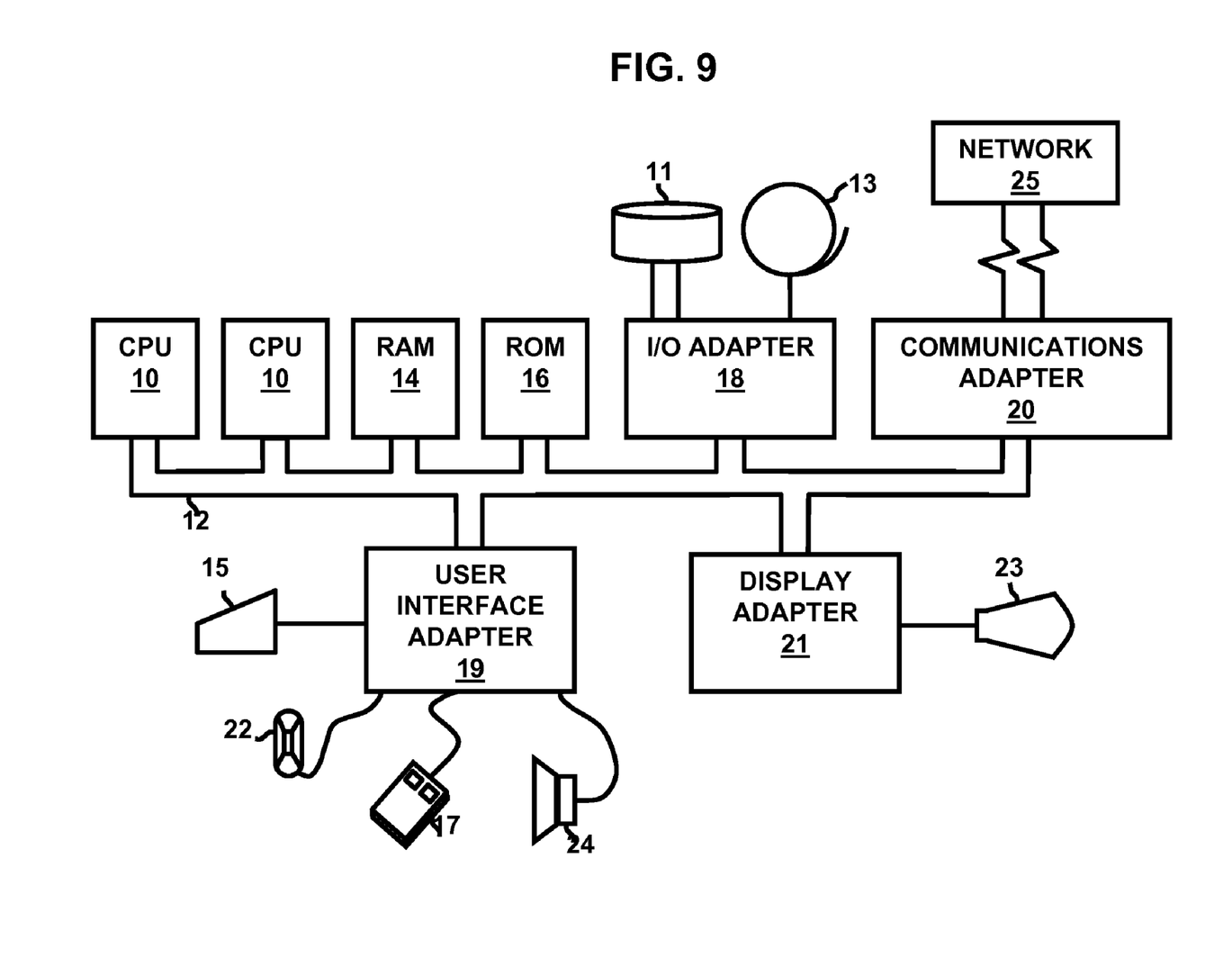
FIG. 9 is a schematic diagram of a computer system according to one embodiment of the invention.

A representative hardware environment for practicing the embodiments of the invention is depicted in FIG. 9. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

While the invention has been described in terms of the preferred embodiments, those skilled in the art will recognize that the invention can be practiced with modification within the spirit and scope of the appended claims.

The invention claimed is:

1. A computer-implemented method of performing materials requirements planning comprising:
   inputting customer demand, where each customer demand has multiple independent due dates, each due date having a different priority;
   calculating demand on components for each of said due dates, considering said priorities;
   calculating demand on suppliers for each of said due dates, considering said priorities; and
   outputting at least one of said demand on components and said demand on suppliers.

2. The method according to claim 1, wherein said calculating of said demand on said components comprises analyzing a bill of materials considering each of said due dates and said priorities.

3. The method according to claim 1, further comprising calculating required production starts considering each of said due dates and said priorities.

4. The method according to claim 1, further comprising calculating lotsizes considering each of said due dates and said priorities.

5. The method according to claim 1, further comprising calculating shipments between locations considering each of said due dates and said priorities and providing corresponding multiple shipping dates with associated priorities.

6. The method according to claim 5, wherein said calculating of said shipments is based on a driver date.

7. A computer storage device readable by computer, tangibly embodying a program of instructions executable by said computer to perform a method of performing materials requirements planning, said method comprising:
   inputting customer demand, where each customer demand has multiple independent due dates, each due date having a different priority;
   calculating demand on components for each of said due dates, considering said priorities;
   calculating demand on suppliers for each of said due dates, considering said priorities; and
   outputting at least one of said demand on components and said demand on suppliers.

8. The computer storage device according to claim 7, wherein said calculating of said demand on said components comprises analyzing a bill of materials considering each of said due dates and said priorities.

9. The computer storage device according to claim 7, said method further comprising calculating required production starts considering each of said due dates and said priorities.

10. The computer storage device according to claim 7, said method further comprising calculating lotsizes considering each of said due dates and said priorities.

11. The computer storage device according to claim 7, said method further comprising calculating shipments between locations considering each of said due dates and said priorities and providing corresponding multiple shipping dates with associated priorities.

12. The computer storage device according to claim 11, wherein said calculating of said shipments is based on a driver date.

13. A computer-implemented method of performing materials requirements planning comprising:
   inputting customer demand, where each customer demand has multiple independent due dates, each due date having a different priority, wherein said multiple independent due dates comprise a commit due date and a customer request due date;
   calculating demand on components for each of said due dates, considering said priorities;
   calculating demand on suppliers for each of said due dates, considering said priorities; and
   outputting at least one of said demand on components and said demand on suppliers.

14. The method according to claim 13, wherein said calculating of said demand on said components comprises analyzing a bill of materials considering each of said due dates and said priorities.

15. The method according to claim 13, further comprising calculating required production starts considering each of said due dates and said priorities.

16. The method according to claim 13, further comprising calculating lotsizes considering each of said due dates and said priorities.

17. The method according to claim 13, further comprising calculating shipments between locations considering each of said due dates and said priorities and providing corresponding multiple shipping dates with associated priorities.

18. The method according to claim 17, wherein said calculating of said shipments is based on a driver date.

* * * * *

UNITED STATES PATENT AND TRADEMARK OFFICE
CERTIFICATE OF CORRECTION

PATENT NO.      : 7,613,536 B2                                          Page 1 of 1
APPLICATION NO. : 11/278818
DATED           : November 3, 2009
INVENTOR(S)     : Robert A. Orzell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Nineteenth Day of October, 2010

David J. Kappos
*Director of the United States Patent and Trademark Office*